July 8, 1947. W. A. BRUCE 2,423,754
ANALYZER FOR SUBTERRANEAN FLUID RESERVOIRS
Filed Sept. 28, 1943
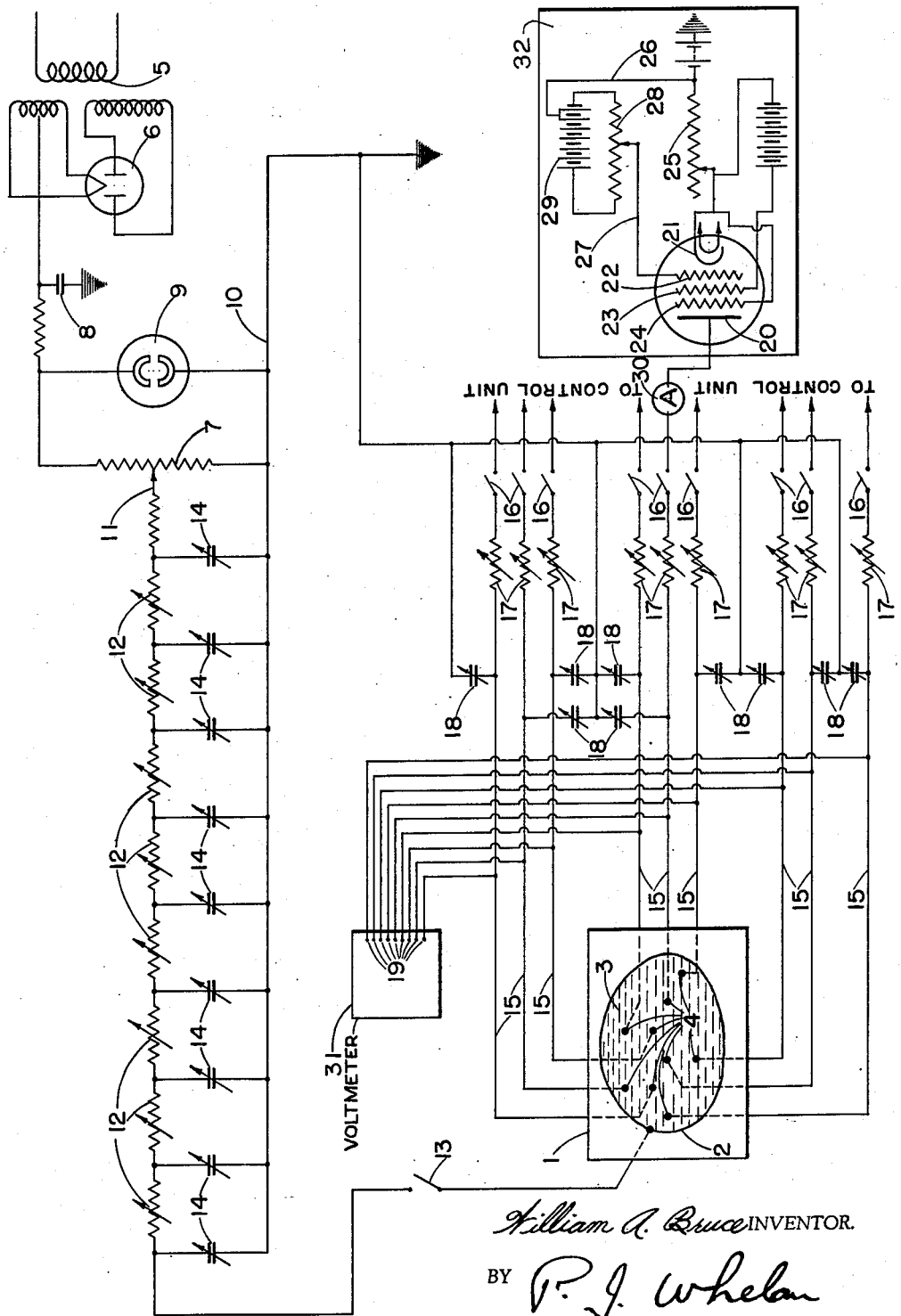
William A. Bruce INVENTOR.
BY P. J. Whelan
ATTORNEY.

Patented July 8, 1947

2,423,754

UNITED STATES PATENT OFFICE 2,423,754

ANALYZER FOR SUBTERRANEAN FLUID RESERVOIRS

William A. Bruce, Tulsa, Okla., assignor to Standard Oil Development Company, a corporation of Delaware Application September 28, 1943, Serial No. 504,109

4 Claims. (Cl. 235—61)

The present invention is directed to a method and means for analyzing the behavior of subterranean reservoirs of fluid, such, for example, as oil fields.

The principal object of the present invention is the provision of a method and apparatus by the utilization of which, on the basis of known history of production of fluid from a subterranean reservoir, it is possible to predict future performance, either pressure decline for a selected production rate or production rate for a selected pressure decline. Likewise it is possible to make recommendations as to the location of future wells and the rate of production so as to realize the most profitable and complete recovery of fluid from the reservoir.

More specifically it is an object of the present invention to provide a method and apparatus in which the past history of production from a subterranean reservoir is introduced electrically into a novel network which may be studied to ascertain future performance of producing wells tapping said reservoir.

This invention is applicable to the study of any fluid reservoir, whether oil, water or gas, or a combination of these. It is capable of yielding information on the future performance of the reservoir under the most varied conditions. For example, it can be used to predict the effect of injection wells at selected points in the reservoir, or the productivity of the reservoir over a future period. Likewise, it can be used to study the effect of shutting in certain wells, of changing the production rate from certain wells, or of tapping the reservoir with additional wells.

Before describing the actual apparatus employed in the practice of the present invention, it may be pointed out that in order to practice this invention certain information concerning the reservoir must be available. In the first place, the subsurface geology must be known with reasonable certainty. The location of any faults which may exist is important. The thickness, porosity and permeability of the producing formation are additional facts which must be available. This information is necessary because in setting up the apparatus used to practice the present invention, certain electrical units are employed the values of which are made to correspond with certain properties of the producing formation.

Furthermore, in setting up this apparatus and selecting these values, it is advantageous to locate isopotential lines in the reservoir to be studied. This is usually done by assuming that at a sufficient distance away from the center of the producing zone the isopotential line may be represented as a circle, because its circular shape at the distance selected would have no significantly different effect on the shape of inner isopotential lines than if its actual configuration were different. This distance should naturally be made as great as possible, since the greater it is, the more accurate will be the results. In some areas it has been found that this outermost isopotential line can have a radius with respect to the center of the producing zone about twice the radius of the producing zone. In other areas its radius may be four times as great as the radius of the producing zone. What this radius will be will depend, to some extent at least, on the amount of information available with regard to the reservoir. Once this outermost isopotential line is located, successive inner isopotential lines can be determined by a study of the kown facts concerning the subsurface geology and the behavior of the reservoir.

Briefly, the system of the present invention is the electrical counterpart of a reservoir tapped by wells and producing under the pressure produced by inflowing water or a water drive. The water drive is represented by a source of power. Suitable resistances are used to simulate the resistance of the formation itself to the flow of fluid. Since the formation has a storage capacity which influences the amount of fluid produced by the wells as a result of a given pressure drop in the water drive, condensers are used in the system to simulate the effect of this storage capacity. The wells are represented as electrical terminals the potentials of which may be measured and from which current may be drawn. A suitable arrangement of resistances and condensers is employed in the output circuit from these terminals to represent constant values associated with the drainage of the formation, such as the productivity factor and the capacity of the fluid to expand as a result of a reduction in pressure.

A more precise conception of the present invention may be obtained from the following detailed description of the accompanying drawing, in which the single figure is a plan view of an electrical network embodying the novel features of the present invention.

Referring to the drawing in detail, numeral 1 designates a table the surface of which is composed of Bakelite or other insulating material. Placed on the table is a strip of metal 2 bent so as to simulate the outline of some isopotential of the reservoir to be studied. This strip of metal is about an inch wide and rests edgewise on the table, thereby forming a shallow tank in which is maintained a layer of fluid 3 such as water or glycerine. At points corresponding to the locations of wells in the reservoir, metal posts 4 are secured to the table, partly immersed in the fluid. Because the potential of these posts is a highly significant value, it is desirable to avoid the generation of potentials which have no bearing on the subject being studied. For this reason the fluid is preferably a substantially non-polar fluid so as to avoid the generation of potentials by polarization. It is also important to avoid the passage of large currents through this fluid, and for this reason a poorly conducting fluid is selected.

A source of electrical power such as the ordinary A. C. power supply is connected through a transformer 5 to a rectifier 6, the output of which is delivered to a voltage divider 7. Connected between the output of the rectifier and the ground is a condenser 8 which serves to level out the pulses from the rectifier. To assist in this function there is also provided between the output of the rectifier and the ground a voltage control tube 9, which is commonly known in the art as a cold cathode tube. The ground line is indicated by numeral 10.

The sliding contact 11 on the voltage divider is connected to the metal strip 2 through a series of resistances 12. There should be at least 6 of these resistances, but there may be as many as desired. The more resistances employed, the more accurate will be the results. These resistances are so selected as to bear the same relation to the transmission of current in the circuit as the permeability of the producing formation between the isopotential lines bears to the transmission of fluid through the formation between these lines. The value of these resistances may vary over a wide range between about 10,000 ohms and a megohm.

In selecting these resistances, the reservoir is divided into blocks between the various isopotential lines hereinbefore referred to. These blocks may be of any arbitrary size. The blocks farthest away from the center may be as long as ten miles and of large cross-sectional area. Closer to the center of the production the blocks become much smaller, the length being measured in feet. Preferably, each block is wholly contained between two isopotential lines.

Each arbitrary block so selected will have a certain resistance to the flow of the reservoir fluid through it, and this resistance is equal to the difference in potential of the isopotentials enclosing the block divided by the average current equivalent to fluid flow through the block. This is in turn equal to the resistance of the block for unit permeability and viscosity times the actual reservoir quantity $v/k$ in which $v$ is the fluid viscosity and $k$ is a factor representing the permeability of the reservoir block. For each such block a resistance 12 is provided. The value for this resistance is so selected that when it is in the circuit the relation $E/I$, where $E$ is the voltage drop across the resistance and $I$ is the current, is equivalent to the fluid resistance of the block.

Also arranged between the line connecting contact 11 and strip 2 and the ground are a plurality of condensers 14. As many of these condensers as there are resistances may be employed. Ordinarily, the number of condensers will be equal to the number of isopotential lines which have been drawn in the reservoir under consideration. The value of each condenser in that case is a function of the storage capacity of the formation between the isopotential lines. The storage capacity between any two isopotential lines will be the lateral area of the formation between these lines multiplied by the thickness of the formation and by its porosity, as well as by a factor representing the effective compressibilty of the fluid. Since the isopotential lines are nearer together as the center of the reservoir is approached, the capacitances of the condensers 14 will be smaller toward the metal strip 2. Usually, the smallest condenser will have a capacity of about one microfarad, while the largest may have a capacity of 1,000 microfarads.

Thus far we have considered the reservoir and the wells. The potential impressed upon the metal strip 2 represents the formation pressure along the isopotential line represented by the strip. Since there is a potential drop between the metal strip and the various posts 4, the potential on each post will represent its bottom hole pressure. This pressure drop can be adjusted by changing the amount or character of the fluid 3.

The rest of the apparatus represents an electrical counterpart of the operation of the wells. Connected to each post is a conductor 15 which is provided with a switch 16 and a resistance 17. Between each conductor and the ground is a condenser 18. Each conductor is also connected by another conductor 19 to a voltage-measuring device 31. If desired, this voltage-measuring device can be of the recording type in which the voltage of each conductor is recorded as a trace on a strip of sensitized paper which may be moved at a selected rate representative of the passage of time if desired.

Since the purpose of this electrical circuit is to measure the effect of drainage through the various wells on the pressure of the water drive, this can be done by connecting an adjustable resistance to each conductor 15 and adjusting this resistance from time to time so as to produce a current proportional to the flow of oil from the selected well to which the conductor 15 is connected. By adjusting this resistance so as to reproduce the flow of fluid from the well from the date of its first production, the fluctuation of the pressure can be observed in the variations of the voltage exhibited by meter 31. If the pressure indicated by the volt meter at the end of the reproduction of the history of a given well does not correspond with the actual bottom hole pressure of that well at the date indicated, adjustment of resistances 12 is necessary, and these should be adjusted in the direction indicated until the voltages measured for different dates for a given well correspond to the actual bottom hole pressures measured in this well on such dates.

When the system is finally adjusted so as to provide proper correlation between voltages and pressures, the production history of the several wells with proper relation to time is reproduced by successive closings of proper switches 16 and adjustment of the resistances connected to the conductors 15. The reproduction of these histories in this apparatus imparts certain conditions of charge on the various condensers such that the apparatus is in an electrical condition analogous to the fluid condition of the reservoir at any time such as the present; hence, the future performance of the reservoir can be ascertained either to the extent of determining the maximum production rate for a given pressure drop or of determining the pressure drop for a given rate of production. In the latter case the adjustable resistances connected to the conductors are adjusted so as to produce currents in the conductors 15 proportional to the production rates desired from the corresponding wells in the future and the effect on the voltages exhibited by meter 31 observed. In the former case the adjustable resistances are adjusted to cause the volt meter 31 to register voltages proportional to the planned pressure drop in the future and the currents in the conductors 15 are observed as measures of the production which can be expected from the various wells for the planned pressure drop.

In a simple arrangement of this type difficulty may be encountered by reason of variations in applied voltage which might upset the calibration of the entire system. Accordingly, it is desirable to employ a resistance device in which the output current can be made directly proportional to the resistance without regard, within limits, to the applied voltage.

Such a system is described in co-pending application Serial No. 531,671, filed by myself and another on April 18, 1944, and entitled "Electrical device," and consists of a special vacuum tube which is a pentode of the 6-J-7 class. This tube has a plate 20, a cathode 21, a control grid 22, a screen grid 23, and a suppressor grid 24. Each conductor 15 is connected behind resistance 17 to the plate of one of these tubes, there being a tube for each conductor. In the drawing only one of the tubes is shown in the rectangle 32.

In this type of tube the plate-current varies with the plate-voltage and with the biasing voltage on the control grid. In other words, for different biasing voltages on this grid, the tube has different plate-current characteristics. Therefore, by a suitable correction to the biasing voltage the plate-current can be maintained substantially constant despite changes in plate voltage.

The success of this device to control currents depends upon the nearly constant variation of the plate-current with plate-voltage found in this pentode vacuum tube. The particular tube used is such that in its normal operation with a constant control grid and a constant screen grid voltage the plate-voltage, plate-current curve becomes a straight line with a 10% rise in plate-current between the limits of 25 and 250 volts on the plate. By putting a large cathode bias resistor in the circuit as indicated by 25 (between 0.5 and 5 megohms) this 10% rise in plate-current can be reduced to less than 0.1 of 1%. Thus, within the limits of accuracy desired, and down to 25 volts on the vacuum tube plate, the plate-current can be made to depend upon the control grid voltage.

By a suitable choice of tube the plate-current will be linearly dependent upon the control grid voltage. Thus, if a linearly wound potentiometer 28 is across the battery 29, the current passing through the control unit will be linearly dependent upon the movement of the pointer 27 of this potentiometer, and will not be dependent upon the potential of the conductor 15.

The use of the necessarily large cathode bias resistor 25 to regulate the plate-current plate-voltage curve necessitates using the bias battery 29 in the unconventional method illustrated. It is connected to the cathode circuit as indicated in such a way that both positive and negative battery bias values can be obtained. When a large enough resistor is used in 25 to give adequate control of the plate-current for variations in plate-voltage, the grid is made so negative that only a very small current can flow. To effect this, the grid bias battery 29 is connected so that positive voltages can be obtained to offset the large negative cathode bias for appreciable plate-currents. However, since small currents also are desired (that is from nearly zero to 500 microamperes), and these could not be attained without grid battery bias, since the self-bias reduces as the current is reduced, a connection such as 26 must be made so that the negative end of the cathode bias is from 3.0 to 4.5 volts above the minimum voltage available when the control slide is at the negative end and from 12 to 18 volts below the maximum when the control slide is at the positive end of 28. Thus in a typical case when 50 microamperes flows the cathode bias resistor is 0.25 megohm and the cathode bias is 12.5 volts and the bias battery potentiometer is adjusted to give about plus 10 volts between the grid and contact 26, which makes a net grid-cathode voltage difference of minus 2.5 volts. This permits 50 microamperes to flow in the plate circuit. Any tendency for this current to increase causes an increase in the negative voltage across the cathode self-bias resistor which reduces the tendency of the plate-current to rise to a vanishingly small value.

The pointer 27 on potentiometer 28 may be operated manually if desired. In actual practice it is preferred to operate this pointer automatically by attaching it to a follower arranged for vertical movement along a template as described and claimed in my co-pending application, Serial No. 610,352, filed August 11, 1945. As explained in said application, the template is cut in the form of a continuous curve, one portion of which represents the past history of a well under investigation, and the other portion of which represents the desired future performance, either of the pressure or the production rate. While the apparatus is being calibrated to make sure that the plate-current changes linearly with movements of pointer 27 an ammeter 30 is arranged in the plate circuit. This ammeter may also be used when the pointer is operated manually for tracings of history of a well, so that the operator may be sure that the plate-current is proportional to the rate of production of a well at any given time. Where a template is employed, however, the ammeter may be omitted during the actual operation of the device.

It is well to comment on the posts 4 and the effect of their size on the operation of the device. Since the area included within strip 2 represents a large area embraced by the iso-potential line represented by strip 2, each post 4 should ordinarily have a diameter which would bear the ratio to the total area within strip 2 borne by the actual diameter of the well to the actual area represented within strip 2. In practice, however, it is preferable to exaggerate the size of the wells by making them of sufficient diameter to represent not only the well itself, but a substantial circle around the well. When this is done, resistance 17 should be adjusted, or an additional resistance should be added to 17, to represent the resistance to flow in the formation between the circle represented by the post and the actual well. With the additional resistance included the voltage indicated for a given post will represent the average formation pressure in the area represented by the post. If a voltage reading is taken in conductor 15 on the far side of the added resistance from the post the potential will be representative of the bottom hole pressure of the well represented by the post. In some areas this figure by suitable comparison factor represents the bottom hole pressure quite accurately and permits the determination of this pressure while the well is flowing.

To recapitulate briefly, with the parts in the position shown in the drawing, switch 13 is closed and potential 7 and resistances 12 are adjusted so that the potential on strip 2 represents, or is equivalent to, the pressure of the iso-potential line represented by strip 2; then, in turn, the various switches 16 are closed at intervals representing the beginning of production from the wells represented by the posts 4 to which they are attached. After each switch 16 is closed the pointer 27 is adjusted to give a plate-current equivalent to or indicative of the rate of production from the well at successive periods in its life. This is done for each well until all of the past history of the field has been reproduced.

Then, if it is desired to ascertain what will be the future production from the wells for a given drop in formation pressure, the various control units are adjusted through the respective pointers 27 so as to give voltage rates on meter 31 corresponding to the desired formation pressures at future dates, and the plate-currents resulting from these adjustments are observed as reduction of future production rates. If it is desired to determine what will be the formation pressure drop for a given desired production rate on the respective wells of a future period the separate controls are adjusted to give plate-current corresponding to the desired future rates of production and the resulting voltages on meter 31 are observed. During this period the voltage of strip 2 can also be followed as indicative of the effect of these future operations on the pressure along the iso-potential line in the area under study represented by strip 2. Similarly, other strips can be arranged inside strip 2 representing other iso-potential lines in the area and the voltages on these strips can be observed for future observation along iso-potential lines represented by them.

In order to convey a better understanding of the manner in which this apparatus is employed in the study of a reservoir, a particular study will be described. The condensers 14 starting at the left of the figure shown in the drawing will be referred to as 14—0, 14—1, 14—2, etc. A relatively simple situation will be assumed in order to illustrate the working of the apparatus.

Let it be assumed that there is an oil reservoir existing in an infinitely homogeneous permeable sand. The area of the oil reservoir is 3,000 acres, the sand 100 ft. thick with a uniform porosity of 25%. There is water in the lower portion of the sand underlying the oil, and from well data, core analyses, and electric logs, the original amount of oil in place in the reservoir was estimated at 350 million barrels.

In setting up the electrical analog of this system, which consists of a fluid-filled homogeneous sand of uniform thickness, it is most convenient to divide the area concerned into concentric circular zones, such that a constant ratio is maintained between the radii of adjacent zone boundaries. For this condition, there is equal fluid resistance, and therefore electrical resistance, across each zone. This means that all the resistances 12 will be equal. Since each electrical capacitance 14 is made proportional to the volume of fluid in the zone it represents, for the above condition the values of the capacitances of adjacent zones will have the same ratio as the square of the ratio of the radii.

The area of the oil pool is the same as that of a circle of a radius of 6450 feet. If the ratio of adjacent radii is arbitrarily chosen, $$\frac{r_n}{r_{n-1}} = 1.3$$

then the ratio of adjacent zone capacitances will be $$\left(\frac{r_n}{r_{n-1}}\right)^2 = 1.69$$

The following table of zone values may then be computed. The first capacitance is chosen arbitrarily, and the others fixed in proportion.

$$\frac{r_n}{r_{n-1}} = 1.3$$

| Zone No. | Radius of Inner Boundary | | Radius of Outer Boundary | |
|---|---|---|---|---|
| | Ft. | Miles | Ft. | Miles |
| Pool | 0 | 0 | 6450 | 1.22 |
| 0 | 6450 | 1.22 | 8385 | 1.59 |
| 1 | 8,385 | 1.59 | 10,900 | 2.06 |
| 2 | 10,900 | 2.06 | 14,170 | 2.68 |
| 3 | 14,170 | 2.68 | 18,420 | 3.49 |
| 4 | 18,420 | 3.49 | 23,950 | 4.59 |
| 5 | 23,950 | 4.54 | 31,130 | 5.90 |
| 6 | 31,130 | 5.90 | 40,470 | 7.67 |
| 7 | 40,470 | 7.67 | 53,610 | 9.96 |
| 8 | 52,610 | 9.96 | 68,390 | 12.95 |
| 9 | 68,390 | 12.95 | 88,910 | 16.84 |

$$\frac{C_n}{C_{n-1}} = 1.69$$

| Zone No. | Area | | Capacitance | Ref. No. or Fig. |
|---|---|---|---|---|
| | Acres | Square Miles | | |
| | | | μfd. | |
| Pool | 3,000 | 4.69 | 5.0 | 18 |
| 0 | 5,070 | 7.93 | 8.5 | 14-0 |
| 1 | 8,570 | 13.40 | 14.3 | 14-1 |
| 2 | 14,480 | 22.65 | 24.2 | 14-2 |
| 3 | 24,470 | 38.25 | 40.8 | 14-3 |
| 4 | 41,360 | 64.65 | 69 | 14-4 |
| 5 | 69,900 | 109.20 | 116 | 14-5 |
| 6 | 118,130 | 184.60 | 197 | 14-6 |
| 7 | 199,640 | 311.95 | 333 | 14-7 |
| 8 | 337,390 | 527.17 | 562 | 14-8 |
| 9 | 570,190 | 890.90 | 950 | Not Shown |

Since the above capacitances are proportional only to the volumes of fluid represented, that of the pool itself must be increased to allow for the greater expansibility of the oil, in this case three times that of water. The total volume of fluid under the pool area may be calculated from sand volume and porosity to be 580 million barrels, of which 350 million, or 60%, is originally oil. Sixty per cent of the pool capacitance, or 3 μfd., is then tripled, bringing the total pool capacitance up to 11 μfd. This capacitance is distributed proportionately amongst the condensers 18 in the manner hereinafter stated.

If the pool contains 75 wells, drilled on 40 acre spacing, they could be divided into from one to ten groups of convenient size. Seven groups might be formed as follows:

| Group No. | No. of Wells |
|---|---|
| I | 12 |
| II | 8 |
| III | 13 |
| IV | 11 |
| V | 12 |
| VI | 9 |
| VII | 10 |

These are represented by No. 4 on the figure.

The average daily rate of production of oil, gas, and water is tabulated for each of these groups of wells by months, and the corresponding rate of withdrawal computed in terms of reservoir volume. A pool unit can then be set up, with the electrodes representing the wells in each group connected together, either directly in the glycerin pool unit, or through a series resistor in a network pool unit. The 11 μfd. assigned to the pool is distributed among the groups in accordance with the number of wells in each group. These are the condensers 18. Enough electrodes to represent zone O may be added to the pool unit, and those representing the outer boundary of this zone are connected together to represent the first isopotential, or water drive ring (No. 2). The capacitance for zone O is attached to these electrodes. The resistance of the glycerin solution (No. 3) between the water drive ring and the pool may be adjusted by changing the depth until some convenient value is obtained. If this is set at .3 megohm per cm. and is 1 cm. deep, then all the other water drive resistors (Nos. 12—1 to 12—9) are set at this same value.

The production data is set upon the production controller so that, using 2.5 seconds to correspond to one month, a current proportional to the rate of production is withdrawn from the pool condensers. This is done by attaching a control unit, such as is shown on the figure, to each well group. If the original pressure of the pool was 1500 p. s. i., 300 volts can be arbitrarily set to correspond to this pressure, that is, one volt equals five pounds, and the condensers of the pool unit and this water drive unit charged up to this voltage. Then preliminary runs are made with the actual pressure history of the pool plotted on the chart on which is recorded the voltage of the pool condensers during the run, and the current is adjusted until the two curves correspond. In this case, a value of .007 μamp./bbl./day was found to be the proper current. Thus, when the pool produces at the rate of 10,000 bbls. per day, the corresponding current is 70 microamps.

With the voltage and pressure curves corresponding, it then may be said that an electrical system has been set up which acts like the compressible fluid system, and which will continue to do so for any assumed future operating conditions, so that the pressure behavior of the pool may be predicated for various rates of production or injection which might be used in the future. From the fluid resistance formulas the compressibility and permeability of the formation may also be computed.

The apparatus described is capable of yielding a great deal of valuable information on reservoir performance. Some of the problems, to the study of which it can be applied, have been referred to specifically above. In its use in the study of any given reservoir, voltage rates taken at different periods of the apparatus, as well as current rates, supply indications of other items of reservoir performance on which information is desired. The effect of excessive production upon one well from the reservoir as a whole, and non-production of other wells can be ascertained. Prospective patterns of future producing wells can be studied with a view of ascertaining the most desirable pattern. Other items of information which can be procured by the use of this apparatus will be evident to those who become skilled in the use of the apparatus.

The nature and operation of the present invention having thus been described and illustrated, what is claimed as new and useful and is desired to be secured by Letters Patent is:

1. An electrical counterpart for a subterranean reservoir undergoing production comprising a source of power representative of the pressure under which said reservoir produces, terminal points connected to said source of power to represent points of withdrawal of fluid from said reservoir, electrical elements between said terminal points and said source of power constituting electrical equivalents of resistance to the flow of fluid in said reservoir and storage capacity of sections thereof, current-consuming elements connected to said terminal points capable of adjustment to reproduce the flow of fluid from the withdrawal points of said reservoir, electrical elements between said terminal points and said current-consuming elements constituting electrical counterparts of factors involved in the flow of fluid at said withdrawal points and indicating devices to indicate the response of certain elements of said network to variations in certain other elements thereof.

2. An apparatus according to claim 1 in which means are provided for the adjustment of the various electrical elements in the network.

3. An apparatus according to claim 1 in which the terminal points are connected to the source of power through a liquid selected to have a resistance such that the potential received by each terminal bears the relation of the potential of the source of power that the bottomhole pressure of the well represented by the terminal bears to the driving pressure represented by the source of power.

4. An apparatus according to claim 1 in which the terminal points are arranged in a pool of liquid having a periphery simulating a selected periphery of the reservoir under investigation, said terminal points being arranged with respect to said periphery so as to reproduce the position of producing wells in said reservoir, said periphery being composed of conductive material and being connected to the source of power so as to receive an electrical potential therefrom corresponding to the driving pressure along the outline of the reservoir represented by said periphery and said liquid being selected to have an electrical resistance such that the drop in voltage between the periphery and any given terminal point represents the difference in pressure between the pressure in the reservoir along the line represented by the periphery and the bottomhole pressure of the well represented by the terminal point.

WILLIAM A. BRUCE.

REFERENCES CITED

The following references are of record in the file of this patent:

M. I. T. Publication #110, Camp and Hazen, June, 1935.